Figure 1:
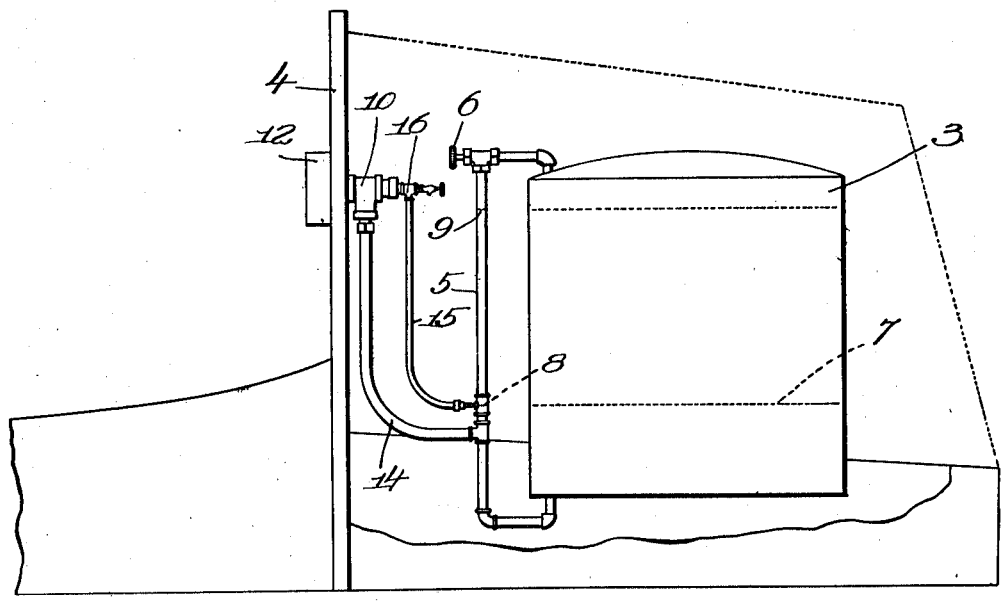

J. J. DEWEY.
WATER LEVEL INDICATOR FOR BOILERS.
APPLICATION FILED APR. 26, 1909.

945,085.

Patented Jan. 4, 1910.

Witnesses:
Fred S. Greenleaf.
Joseph M. Ward.

Inventor
John J. Dewey

UNITED STATES PATENT OFFICE.

JOHN J. DEWEY, OF HARTFORD, VERMONT.

WATER-LEVEL INDICATOR FOR BOILERS.

945,085.  Specification of Letters Patent.  Patented Jan. 4, 1910.

Application filed April 26, 1909. Serial No. 492,279.

*To all whom it may concern:*

Be it known that I, JOHN J. DEWEY, a citizen of the United States, residing at Hartford, county of Windsor, and State of Vermont, have invented an Improvement in Water-Level Indicators for Boilers, of which the following description, in connection with the accompanying drawing, is a specification, like numerals on the drawing representing like parts.

This invention has for its object to provide a novel water level indicator for boilers by means of which a thermometer or other temperature-indicating instrument may be made use of to indicate the water level in the boiler.

The invention is capable of use with boilers of any type, although it has special advantages when used in connection with boilers for motor vehicles and other boilers which are operated under high pressure.

It is customary to provide boilers with a water column which is connected to the boiler above the normal water level and below the low water level so that the water level in the water column corresponds at all times to the water level in the boiler. The water in the water column does not circulate but is heated largely through its contact with the steam, and as a result the temperature of the water at any point in the water column varies in accordance with the distance of said point from the water level, the temperature increasing as the water level approaches said point and diminishing as the water level rises above said point. It has heretofore been proposed to make use of this fact to determine the water level in the boiler by providing a thermometer which registers at all times the temperature of the water at a point in the water column corresponding to the low or danger line in the boiler. With an arrangement of this kind the thermometer will indicate a lower or higher temperature depending on whether the water level in the boiler is high or low, the indicated temperature increasing as the water level in the boiler falls. My present invention is an improvement on this type of water level indicator having such a construction that the thermometer may be placed at a distance remote from the water column and yet accurately indicate the temperature at the pre-determined point in the water column. My improvement makes this type of water level indicator especially applicable to steam automobiles, for the thermometer may be placed on the dash-board where it can be readily seen and will yet give the proper indication of the water level.

I will first describe one embodiment of my invention and then point out the novel features thereof in the appended claims.

Figure 2:
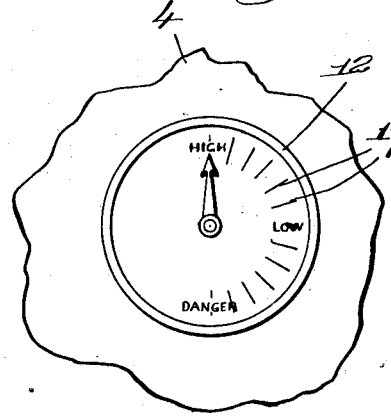
Figure 3:
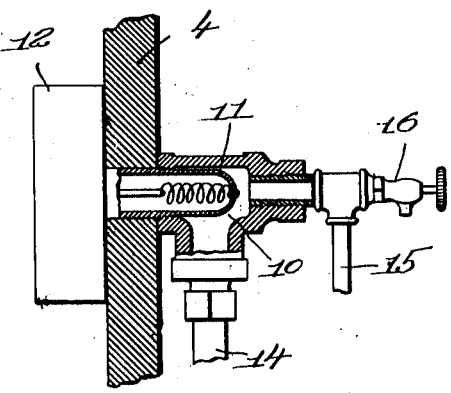

In the drawings, Figure 1 is a view of an automobile boiler having my improvements applied thereto; Fig. 2 is a front view of the thermometer; Fig. 3 is a sectional view through the circulating chamber in which the bulb of the thermometer is placed.

Although I have shown the invention as applied to a boiler for an automobile, yet I wish it understood that it can be equally well applied to other types of boilers.

In the drawings 3 designates the boiler which may have any suitable or usual construction but which is preferably of the upright type. This boiler is shown as being situated in front of the dash-board 4 of the automobile. The boiler has associated therewith the usual water column 5 which is connected at its lower end to the boiler below the low water line and at its upper end to the boiler above the normal water line, and which is provided with the usual shut-off valve 6.

The parts thus far described are such as are commonly found in automobile and other boilers and form no part of my present invention.

It is a fact that the temperature of the water at a pre-determined point in the water column will vary with the water level in the boiler, the temperature of the water at this point increasing when the water level falls and decreasing when the water level rises. It has heretofore been proposed to determine the water level in the boiler by placing a thermometer in the water column at a pre-determined point, but a device of this character is not adapted for use on automobiles, because the thermometer would not be in a position where it could be read.

My invention consists in providing a novel method of determining the temperature of the water at a pre-determined point in the water column by which the thermometer can be placed on the dashboard at a point remote from the water column.

In the drawings the low water line in the boiler is indicated at 7 and the corresponding point in the water column is indicated at 8. In order to determine the temperature of the water at the point 8 by a thermometer placed at a distance from the water column I provide a circulating chamber 10 which is connected to the water column 5 below the point 8 by a pipe 14, and is also connected to the water column at or above the point 8 by a pipe 15. The pipe 15 may be provided with a pet-cock 16 if desired. The circulating chamber 10 is situated above the low water line 7 and is arranged to receive the bulb 11 of a thermometer 12 which can conveniently be placed on the dashboard 4 of the automobile. The thermometer I have herein shown is a mechanical thermometer rather than a liquid thermometer. The mechanical thermometer has been selected because it can be more readily attached to the dashboard than the liquid thermometer and is less liable to become broken. The pipe 14 is larger than the pipe 15 and because of this fact there will be a loss of heat in the water in said pipe due to radiation. The water in the pipe 14 will, therefore, become slightly cooler than the water in the pipe 15, and a circulation of water will be established up the pipe 15 through the circulating chamber and down the pipe 14, so that the water in the chamber 10 will be at substantially the same temperature as that in the water column between the points where the pipes 14 and 15 connect thereto. Since the bulb of the thermometer is situated in the chamber 10, the thermometer will at all times indicate this temperature. As stated above, the temperature of the water in the water column between the points where the pipes 14 and 15 enter the same varies with the water level, the temperature being higher as the water level in the column approaches the point 8 by the gradual lowering of the water level in the boiler, and being lower when the boiler is full.

By having the graduations 17 of the thermometer properly marked, it is possible by means of my construction to determine at all times the water level in the boiler.

My invention is not a low water alarm which gives indication only when a low water level is reached, but is, on the other hand, a device for indicating at all times the water level in the boiler.

Having fully described my invention, what I claim as new and desire to secure by Letters Patent is:—

1. The combination with a boiler and a water column connected thereto, of a circulating chamber situated above the low water line of the boiler, circulating pipes connecting said chamber to the water column at two points situated one above the other whereby a circulation will be established in said pipes due to the difference of the temperature of the water in said column at said two points, and means for indicating the temperature of the water in the circulating chamber.

2. The combination with an automobile having a dashboard, of a boiler having a water column, a circulating chamber sustained by the dashboard and situated above the low water line of the boiler, two circulating pipes connecting said circulating chamber to the water column at different points, and a thermometer sustained by the dashboard for indicating the temperature of the water in the circulating chamber.

3. In a water level indicator for automobile boilers, the combination with an automobile having a dashboard, of a boiler having a water column, a circulating chamber sustained by the dashboard and situated above the low water line of the boiler, two circulating pipes of different diameters connecting said circulating chamber to the water column at different points and a thermometer sustained by the dashboard for indicating the temperature of the water in the circulating chamber.

In testimony whereof, I have signed my name to this specification, in the presence of two subscribing witnesses.

JOHN J. DEWEY.

Witnesses:
Louis C. Smith,
Thomas J. Drummond.